United States Patent
Reichart et al.

(10) Patent No.: US 9,965,348 B2
(45) Date of Patent: *May 8, 2018

(54) OPTIMIZED GENERATION OF DATA FOR SOFTWARE PROBLEM ANALYSIS

(71) Applicant: INTERNATIONAL BUSINESS MACHINES CORPORATION, Armonk, NY (US)

(72) Inventors: Markus Reichart, Sindelfingen (DE); Michael K. Schaefer, Sidelfingen (DE)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/538,890

(22) Filed: Nov. 12, 2014

(65) Prior Publication Data

US 2016/0132419 A1    May 12, 2016

(51) Int. Cl.
| | | |
|---|---|---|
| *G06F 11/00* | (2006.01) | |
| *G06F 11/07* | (2006.01) | |
| *G06F 11/36* | (2006.01) | |

(52) U.S. Cl.
CPC ........ *G06F 11/079* (2013.01); *G06F 11/3636* (2013.01); *G06F 11/3684* (2013.01)

(58) Field of Classification Search
CPC ............... G06F 11/079; G06F 11/2252; G06F 11/2257; G06F 11/2263; G06F 11/2273;

(Continued)

(56) References Cited

U.S. PATENT DOCUMENTS 5,428,619 A * 6/1995 Schwartz ............ G06F 11/2257 706/916
5,983,364 A * 11/1999 Bortcosh ............. G06F 11/2257 714/25

(Continued)

FOREIGN PATENT DOCUMENTS

WO    2015148328 A1    10/2015

OTHER PUBLICATIONS

"A Self Learning and Configurable Error Diagnostics Tool in Support of Call Centers and Application Support". An IP.com Prior Art Database Technical Disclosure. IP.com No. IPCOM000213190D. IP.com Electronic Publication: Dec. 7, 2011.

(Continued)

*Primary Examiner* — Gabriel Chu
(74) *Attorney, Agent, or Firm* — Edward J. Wixted, III (57) ABSTRACT

A computer optimizes the prospective generation of data used for analysis of a software problem. The computer generates data in accordance with data generation parameters and a software problem is analyzed with reference to the data so generated. The problem analysis produces a report that details specifics of the software problem, the data that was available for analysis, a flag to indicate success or failure of the analysis to identify a root cause, and information about whether the data supplied was insufficient, sufficient, or superfluous with respect to identifying a root cause of the software problem. The method then uses the analysis report to modify the data generation parameters, thereby iteratively optimizing the data that are generated for analysis of subsequent software problems.

12 Claims, 4 Drawing Sheets

(58) Field of Classification Search
CPC ............ G06F 11/3688; G06F 11/0751; G06F 11/0793; G05B 23/0216; G05B 23/0275; G05B 23/0278; G05B 23/0281; H04L 41/0631; H04L 41/0636; H04L 41/0645
See application file for complete search history.

(56) References Cited

U.S. PATENT DOCUMENTS

| | | | | |
|---|---|---|---|---|
| 6,145,096 | A * | 11/2000 | Bereiter | G06F 11/0748 714/25 |
| 6,654,914 | B1 * | 11/2003 | Kaffine | H04L 12/2602 714/4.2 |
| 6,724,401 | B1 | 4/2004 | Hennum et al. | |
| 7,933,666 | B2 | 4/2011 | Campbell et al. | |
| 8,312,435 | B2 | 11/2012 | Wygodny et al. | |
| 9,274,902 | B1 * | 3/2016 | Morley | G06F 11/2002 |
| 9,590,880 | B2 | 3/2017 | Ashby et al. | |
| 2002/0198983 | A1 * | 12/2002 | Ullmann | G06F 11/0709 709/224 |
| 2004/0034456 | A1 * | 2/2004 | Felke | B64F 5/0045 701/32.9 |
| 2004/0268314 | A1 * | 12/2004 | Kollman | G06F 11/3476 717/128 |
| 2005/0154939 | A1 * | 7/2005 | De Pauw | G06F 11/3688 714/25 |
| 2006/0048004 | A1 * | 3/2006 | Kawashima | G03G 15/5075 714/23 |
| 2006/0112312 | A1 * | 5/2006 | Dickenson | G06F 11/3636 714/28 |
| 2006/0174165 | A1 * | 8/2006 | Shaffer | G06F 11/3476 714/38.13 |
| 2007/0113180 | A1 | 5/2007 | Danninger | |
| 2009/0171741 | A1 | 7/2009 | Bishop et al. | |
| 2009/0183237 | A1 | 7/2009 | Cortes et al. | |
| 2009/0222492 | A1 * | 9/2009 | Yamauchi | G06F 11/3476 |
| 2013/0283241 | A1 * | 10/2013 | Krajec | G06F 11/3636 717/128 |
| 2014/0310222 | A1 * | 10/2014 | Davlos | G06N 5/04 706/46 |
| 2016/0078061 | A1 * | 3/2016 | Hilsdale | G06F 19/322 707/687 |

OTHER PUBLICATIONS

Appendix P—List of IBM Patents of Patent Applications Treated as Related.
U.S. Appl. No. 14/735,587 entitled "Optimized Generation of Data for Software Problem Analysis", filed Jun. 10, 2015.

* cited by examiner

OPTIMIZED GENERATION OF DATA FOR SOFTWARE PROBLEM ANALYSIS

BACKGROUND OF THE INVENTION

The present invention relates generally to the field of software problem determination, and more particularly to data generation for software problem analysis. When analyzing a software problem, it is desired to have enough data to enable a successful analysis. However, generating excess data, while often not detrimental to the analysis, may adversely impact system performance. System administrators try to balance the need for sufficient data against the performance impact of generating that data. Finding an optimum balance is often a continual trial and error proposition.

SUMMARY

Embodiments in accordance with the present invention disclose a method, computer program product, and system for optimizing prospective generation of data used for analysis of a software problem. In one embodiment, a computer generates data in accordance with data generation parameters. A computer analyzes the data generated and creates a report detailing the nature of the software problem, the data that was available for the analysis, a flag to indicate whether the analysis was able identify a root cause of the software problem, and information to identify whether the data supplied was insufficient, sufficient, or superfluous with respect to identifying a root cause of the software problem. A computer modifies the data generation parameters in accordance with the analysis report, to iteratively optimize data generated for analysis of subsequent software problems.

DETAILED DESCRIPTION

If a user encounters a problem with a computer software product, they may contact the product vendor, or in-house support, to seek a solution. An automated system may analyze certain data, to attempt to identify the cause of the problem. Types of problems that a user might encounter include a system crash, slow system performance, unexpected system behavior, etc.

The amount and types of data sufficient to identify the root cause of a problem, differ from case to case. For example, to successfully analyze a problem such as "Accessing a non-initialized variable (NullPointerException)," it may be sufficient to examine the exception call stack. However, a "memory leak" problem may be particularly difficult to analyze, and may require the user to reproduce the problem in a production environment, using special trace settings. Moreover, there may be multiple iterations before the root cause can be identified.

Many systems prospectively generate certain data, according to data generation parameters, in order to have available for analysis enough relevant data to analyze a problem, should one occur. To maximize system performance, the data generation parameters may be configured such that a minimum amount of problem analysis data is generated. When a change to the data generation parameters is required, the change often may be initiated by a system administrator.

When analyzing a system problem, if enough relevant data is not available, it may become necessary to modify the data generation parameters, so as to generate more data, and then to reproduce the problem, such that there can then be sufficient data to enable a successful analysis of the problem. This process may have to be repeated multiple times, until at least a sufficient amount of data, of the relevant data types, is generated to enable a successful analysis.

If the data generation parameters are configured such that excessive data is generated, overall system performance can be negatively impacted. It is a desired aspect of optimized data generation parameters to strike a balance between generating enough data to resolve most problems efficiently, while not generating too much data and thereby impacting system performance. Finding an optimum balance is often difficult, and is further complicated when system operating parameters change.

Embodiments in accordance with the present invention introduce a feedback loop to iteratively optimize data generated for analysis of a software problem and thereby enable the analysis to converge on a solution to the problem and further to optimize data generation for analysis of a subsequent problem. Components and operational aspects of the feedback loop are discussed below, particularly with reference to FIGS. 2 and 3.

Figure 1:
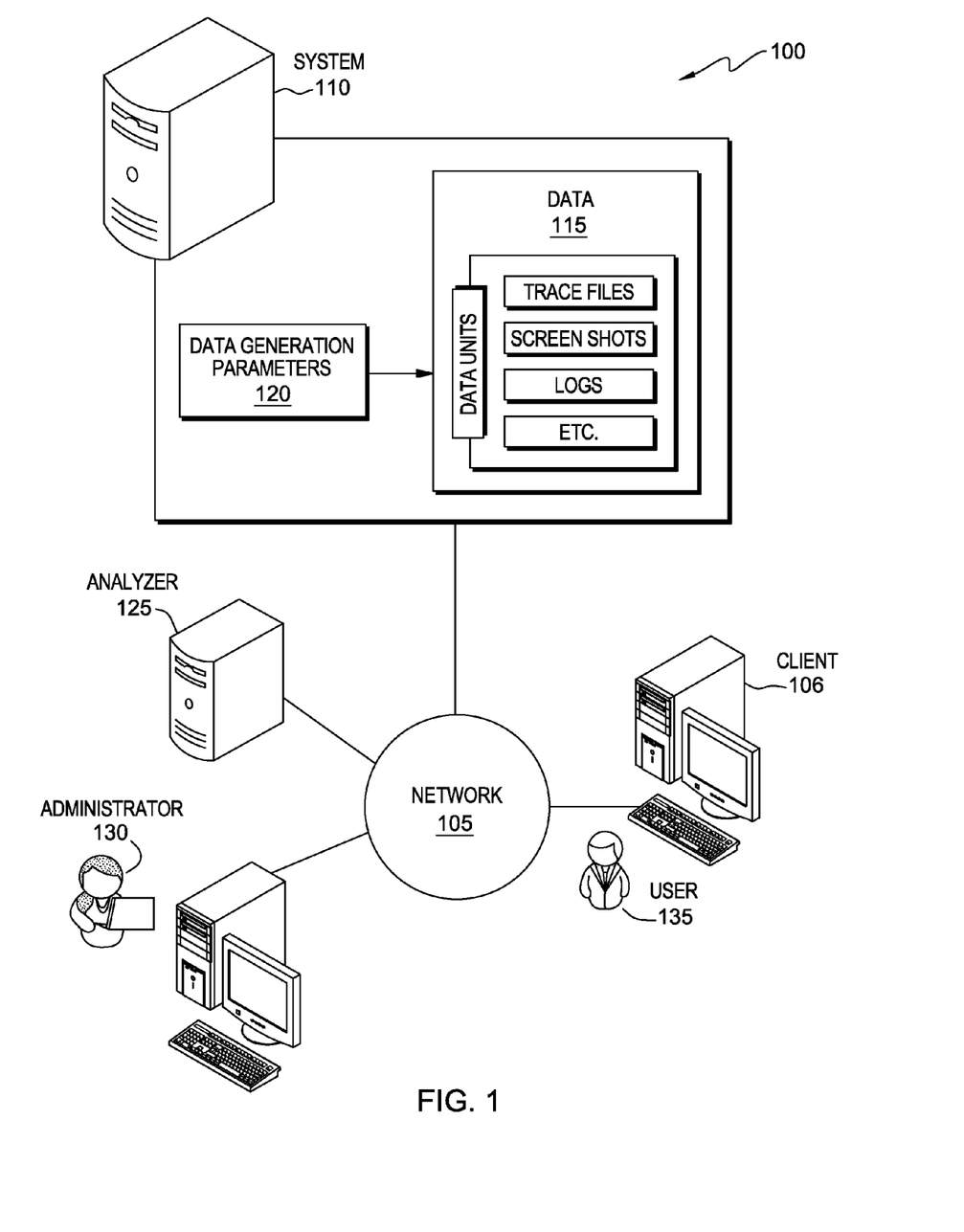
FIG. 1 is an illustrative diagram of a data processing environment, generally designated 100, is provided in which embodiments in accordance with the present invention may be implemented.

With reference now to FIG. 1, an illustrative diagram of a data processing environment, generally designated 100, is provided in which embodiments in accordance with the present invention may be implemented. It should be appreciated that FIG. 1 is only illustrative and is intended neither to assert nor imply any limitation with regard to the environments in which aspects of embodiments in accordance with the present invention may be implemented. Many modifications to the depicted environment may be made without departing from the spirit and scope of the present invention.

Data processing environment 100 includes a data processing system, designated as system 110, and one or more each, of user 135, client 106, and analyzer 125 respectively and administrator 130, interconnected over network 105. The data processing environment may further comprise data generation parameters 120, and data 115.

During routine operation of system 110, data 115 is generated, according to data generation parameters 120. If a system problem occurs, data 115 is a source of information which analyzer 125 can reference when analyzing the problem. Data 115 may be composed of data units comprising various types of data, in various respective quantities, including trace files, screenshots, logs of user actions, video files, audio files, etc. Data generation parameters 120 may define, at least, which data units are generated, maximum sizes for certain data units, and conditions under which older data units are discarded or replaced with newer ones, etc. For example, data generation parameters 120 might specify a maximum number of five trace files, of 20 MB maximum size. In this example, when five trace files already exist, and a sixth one is created, the oldest of the previous five is discarded.

System 110 may be a mainframe computer, a desktop computer, a laptop computer, a specialized computer server, or any other computer system known in the art. In certain embodiments in accordance with the present invention, system 110 represents a computer system utilizing clustered computers and components that act as a single seamless pool of resources, when accessed through network 105, as is common in data centers and with cloud computing applications. In general, system 110 is representative of any programmable electronic device or combination of programmable electronic devices capable of executing machine-readable program instructions and communicating with other computing devices via a network. Components of system 110 are described in greater detail with reference to FIG. 4.

In various embodiments in accordance with the present invention, client 106 can be a laptop computer, a desktop computer, or any programmable electronic device capable of communicating with system 110, either via a direct connection or via network 105.

In general, network 105 can be any combination of connections and protocols that will support communications between system 110 and client 106. Network 105 can include, for example, a local area network (LAN), a wide area network (WAN) such as the internet, or any combination of the preceding, and can further include wired, wireless, and/or fiber optic connections.

Analyzer 125 can be an automated system operationally coupled with system 110. The function of analyzer 125 is to analyze software problems arising in the operation of system 110. In at least one embodiment in accordance with the present invention, analyzer 125 employs various computer-implemented analysis techniques, some of which include cognitive computing techniques, image analysis in conjunction with character recognition, pattern recognition and other suitable techniques, toward the end of finding a root cause of the problem. A root cause of a problem is defined herein as one or more causes, that when eliminated, will prevent or significantly reduce the likelihood of a recurrence of the problem.

Figure 2:
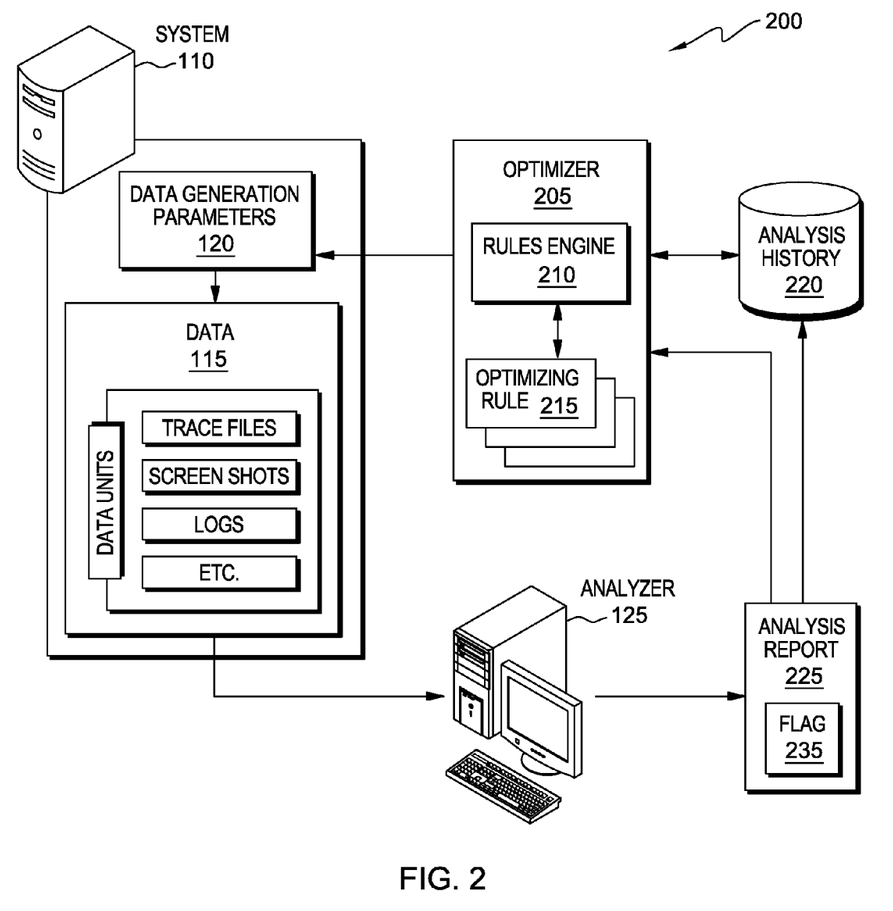
FIG. 2 depicts a feedback loop, in an embodiment in accordance with the present invention, to automatically and continuously optimize generation of data for problem analysis.

FIG. 2 depicts a feedback loop, in an embodiment in accordance with the present invention, to automatically and continuously optimize generation of data for problem analysis. The feedback loop comprises at least the following components operating within environment 100 of FIG. 1: Data generation parameters 120; data 115, generated according to data generation parameters 120; analyzer 125; analysis report 225 produced by analyzer 125; optimizer 205 comprising rules engine 210 and one or more optimizing rules 215; and analysis history 220 which is accumulated by saving and accumulating one or more analysis report 225.

Analysis report 225 is created by analyzer 125. Analysis report 225 may comprise: 1) Flag 235, a Boolean element, to indicate whether the analysis is a success or a failure. A failed analysis is one in which analyzer 125 is not able to identify a root cause of a software problem under analysis. A failed analysis may be indicated when flag 235 is set to a first pre-determined value, for example: "FALSE". A successful analysis is one in which analyzer 125 is able to identify a root cause of a problem under analysis. A successful analysis may be indicated when flag 235 is set to a second pre-determined value, for example: "TRUE"; 2) A problem description, comprising, for example, a stack trace, a formal problem classification, freeform text, etc., or any combination thereof; 3) An assessment and classification of the usefulness of data 115, determined by assessing whether data 115 was necessary and of sufficient quantity for a successful analysis of the problem, wherein the classification indicates at least: 3a) Sufficiency of each type of data included in data 115 for a successful analysis; 3b) For each type of data included in data 115, whether too little, too much, or the correct amount of data was included; and 3c) Whether data types absent from data 115 would have been required for a successful analysis.

Analysis history 220 is a repository storing an accumulation of analysis reports 225 pertaining to one or more software problem analyses. Analysis history 220 comprises a historical record of previous problem analyses as recorded in analysis reports 225. Analysis history 220 can also store results of previous optimizations. Optimizer 205 can make reference to analysis history 220, as required, for evaluation of optimizing rules 215. Analysis history 220 may comprise a relational database or any other suitable data storage implementation in an embodiment in accordance with the present invention, to accumulate, retain and retrieve data from analysis reports 225.

Analysis report 225 is formatted such that it can be read by rules engine 210. Examples of formatting options for analysis report 225 include: An XML document based on a data structure adapted for the present purpose; a data object that can be serialized and de-serialized; or a text document or a spreadsheet with a predefined data structure. Analysis report 225 may also comprise one or more records in a relational database.

Optimizer 205 comprises rules engine 210 and at least one optimizing rule 215. Optimizer 205 can modify data generation parameters 120, according to evaluation results of optimizing rules 215, in order to optimize data 115 for efficient problem analysis. Various evaluation strategies can be implemented by optimizer 205, such as, but not limited to: 1) Applying only the first rule that evaluates to "True"; or 2) Applying more than one rule that evaluate to "True". Whichever strategy is implemented is an aspect of a particular embodiment in accordance with the present invention, and is neither defined nor limited by this disclosure.

Optimizer 205 can be part of system 110, or it can be on one or more separate systems. Furthermore, multiple optimizers 205, included in multiple feedback loops, can be implemented that independently optimize different aspects of system 110.

An optimizing rule 215 comprises a Boolean condition and one or more actions. A Boolean condition is a logical test that can be resolved either to "True" or "False". When optimizing rule 215 is evaluated and its Boolean condition resolves to "True," the one or more actions defined by optimizing rule 215 are triggered.

An advantage afforded by embodiments in accordance with the present invention is great flexibility. Complex optimizing rules 215 can be defined so as to consider, among other things, analysis results from previous optimizations. For example, it would be possible for optimizer 215 to cause system 110 to revert directly to a previously optimized state when system 110 characteristics change (such as when a fix is installed) without having to gradually converge again toward the optimized state.

Yet another advantage afforded by embodiments in accordance with the present invention is that in addition to modifying data generation parameters 120, optimizing rules 215 can be defined so as to modify system 110. Such modifications could include, for example: 1) Applying a diagnostic component to provide additional analysis data that otherwise would not exist; 2) Modifying applications installed on system 110 by, for example, adding trace statements to a JavaScript program; 3) Making a configuration change not directly related to error analysis but that indirectly enables efficient diagnosis of the error: For example, in an OutOfMemory error, size of allocated memory could be increased in order subsequently to determine whether the error might be caused by insufficient memory allocation, a memory leak, or an infinite loop.

The plurality of optimizing rules 215 can be configured to achieve certain optimization goals. For example, different goals could be desired for a development environment as opposed to a production environment. One goal could be to minimize the overall performance impact of the data generation process, thus accepting a certain proportion of problems that cannot be analyzed successfully. Another goal could be to achieve a specified minimum analysis success rate. Some goals might be based on a specific timeframe (for example: less data generated on the weekend, and more during the week. Furthermore, multiple goals could be implemented concurrently, such as for example, to have a minimal system performance impact that also achieves a specified minimum analysis success rate.

Optimizer 205 uses rules engine 210 to evaluate optimizing rules 215. There are many possible implementations of rules engine 210. Optimizing rules 215 can be evaluated, for example, responsive to receipt of a new analysis report 225, or based on a defined schedule. An optimizing rule 215 could specify, as part of its Boolean condition, when it should be evaluated, such as for example, after a specified number of analysis reports 225 were received or when a specified amount of time has elapsed since its previous evaluation.

One or more actions defined in optimizing rule 215, when carried out, can modify data generation parameters 120 or system 110 configuration parameters, both of which may in turn, influence continuing generation of data 115, thus completing the feedback loop. More particularly, actions can, for example: Disable generation of types of data that have proven to be of little use; enable generation of data types that were required by analyzer 125 but not included in data 115; modify trace settings such that more or fewer traces are written; modify system 110 configuration by, for example, installing fixes or patches for debugging purposes, or by uninstalling fixes or patches that were previously used for debugging purposes, and are no longer required; or modify an optimizing rule 215, thereby indirectly affecting data generation parameters 120, by altering the conditions under which certain modifications to data generation parameters 120 are carried out.

Optimizing rules 215 may be defined with respect to relevant factors. In some embodiments in accordance with the present invention, a default set of optimizing rules 215 is provided for example, as an aspect of the system or software product. Optimizing rules 215 can subsequently be modified, for example, to reflect changes in optimization goals, changes in system configuration, or ongoing problem analysis performance. Furthermore, optimizing rules 215 may be updated automatically by optimizer 205, by, for example, performing actions triggered by optimizing rules 215.

Some example rule sets will now be provided to illustrate various approaches that could be defined within optimizer 205, in embodiments in accordance with the present invention.

Ruleset 1 takes into account, that by default, only a limited number of trace files are kept at a time (for example 5 trace files are kept at a time with a maximum size of 20 MB each). If a problem analysis requires a trace file older than the oldest trace file retained, the analysis cannot be successful, because the required trace file will have already been deleted. Therefore, ruleset 1 increases or decreases the number of trace files, according to the Boolean conditions in the rules, in order to find a number of trace files such that there will be enough trace files for problem analysis in most cases.

Rule 1-1: If an analysis was not successful, and analysis report 225 states that not enough trace files existed for a successful analysis, increase, by 1, the number of trace files that are retained.

Rule 1-2: If the analysis was successful, and analysis report 225 states that more trace files were provided than required for the successful analysis, decrease, by 1, the number of trace files that are retained.

Ruleset 2 is designed to determine the best trace level for system 110. The trace level steps can be, in ascending order from least detailed to most detailed, for example, "None, Info, Fine, Finer, Finest, All". A trace level controls the amount of information that is written to the trace files, the greatest amount being written when trace level is set to "All". When more information is written to the trace files, the performance impact to system 110 is greater than when lesser information is written.

Rule 2-1: Based on data in analysis history 220, if fewer than 80 percent of analyses in the last 30 days were successful, increase the trace level by one step.

Rule 2-2: Based on data in analysis history 220, if more than 90 percent of analyses in the last 30 days were successful, decrease the trace level by one step.

Ruleset 3 describes a generic logic to enable or disable generation of specific data types, based on the result of a problem analysis.

Rule 3-1: If an analysis is not successful, and analysis report 225 states that a specific type of data would be required for a successful analysis, but was missing from data 115, enable generation of the missing data type.

Rule 3-2: If the analysis was successful, and analysis report 225 states that a specific type of data was provided, but was not required for the analysis, disable generation of the unnecessary data type.

Ruleset 4 checks whether an additional type of data should be generated. If an error occurs in the component "com.ibm.bpm.dataAccessLayer" (which can be determined, for example, based on an exception call stack, or based on user 135 feedback), then the SQL log files are required for a successful analysis because they provide further insights into the database processing. If errors no longer occur in "com.ibm.bpm.dataAccessLayer" because, for example, a fix was installed, thus changing system 110 characteristics, then it is no longer required to generate the SQL log files.

Rule 4-1: Based on data in analysis history 220, if in the last five days, more than one error occurred in the component "com.ibm.bpm.dataAccessLayer", capture the SQL log files whenever they are changed.

Rule 4-2: Based on data in the analysis history 220, if in the last five days, no error occurred in the component "com.ibm.bpm.dataAccessLayer", stop capturing the SQL log files.

Ruleset 5 optimizes the system when multiple users report issues with the same dialog in a user interface. This type of issue can be difficult successfully to analyze, because it can depend on the order in which the user clicked elements in the dialog, on data in the system 110 backend, or other factors. Therefore, it is often not enough, for analysis purposes, to look only at a trace. Ruleset 5 enables the (voluntary) recording of a user's actions within this specific dialog (in the present example, a "CreateNewInsuranceClaim" dialog). The recording could be a log of user actions (text input, mouse clicks, etc.) or screenshots that are taken upon each user action.

Rule 5-1: Based on the data in analysis history 220, if in the last 24 hours, at least two users reported issues using the "CreateNewInsuranceClaim" dialog, enable the voluntary recording of user actions in this dialog.

Rule 5-2: Based on the data in the analysis history 220, if in the last 24 hours, fewer than two users reported issues with using the "CreateNewInsuranceClaim" dialog, disable the recording of user actions in this dialog.

Ruleset 6 is directed at a specific component to demonstrate how an optimizing rule can be narrowly targeted if, for example, the component generates a number of errors in excess of a predefined threshold. The rule not only enables a specific trace setting ("com.ibm.bpm.common.*=ALL") if an error occurs in the component, but also optimizes the trace level for this setting (for example by reducing it to "com.ibm.bpm.common.*=FINER". Ruleset 6 demonstrates a narrowly targeted example optimization of data 115.

Rule 6-1: Based on data in analysis history 220, if in the last 2 hours an error occurred in the component "com.ibm.bpm.common", enable the trace setting "com.ibm.bpm.common.*=ALL".

Rule 6-2: Based on data in analysis history 220, if the tracing for component "com.ibm.bpm.common" is active, and the last 2 error analyses for the component were successful, and the provided trace information was more than required, decrease the trace level by one step.

Rule 6-3: Based on data in analysis history 220, if the tracing for component "com.ibm.bpm.common" is active, and the last 2 error analyses for this component were not successful, and the provided trace information was not enough, increase the trace level by one step.

Rule 6-4: Based on data in analysis history 220, if in the last 24 hours no errors occurred in the component "com.ibm.bpm.common", disable the trace setting "com.ibm.bpm.common.*".

Ruleset 7 is an example of rules that require detailed knowledge about the system. In this example, enhanced tracing is only available beginning with a specific version of the installed software.

Rule 7-1: If the error stack trace shows a failure in component "com.ibm.wps.failedevents" and the version check of the system returns "7.0.2.4" or earlier, install update "7.0.2.5" and set trace to "com.ibm.wpsfailedevents.*=FINEST".

Rule 7-2: If the error stack trace shows a failure in component "com.ibm.wps.failedevents" and the version check of the system returns "7.0.2.5" or later, set trace to "com.ibm.wps.failedevents.*=FINEST".

Figure 3:
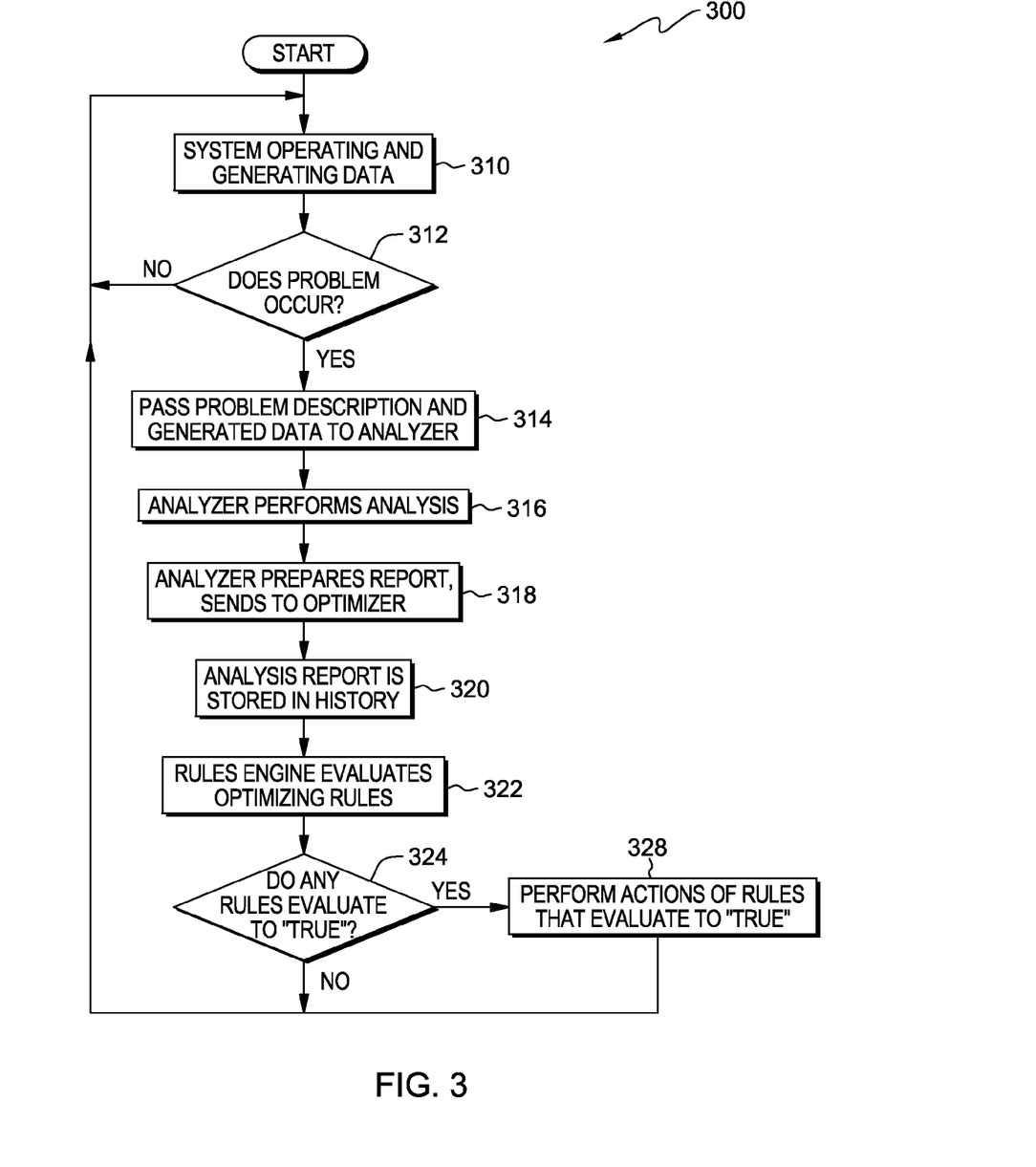
FIG. 3 is a flowchart depicting functions comprising the feedback loop, in an embodiment in accordance with the present invention.

FIG. 3 is a flowchart depicting functions comprising the feedback loop in an embodiment in accordance with the present invention. During normal system operation (block 310 and decision 312 "No" branch), system 110 generates data 115, according to data generation parameters 120. Responsive to occurrence of a problem (decision 312, "Yes" branch), data 115, along with a problem description, are passed to analyzer 125 (block 314).

Analyzer 125 analyzes the problem (block 316), based at least in part, on data 115 and the problem description. Analyzer 125 produces analysis report 225 and sends it to optimizer 205 (block 318). Analysis report 225 is stored in analysis history 220 (block 320).

In an embodiment in accordance with the present invention, rules engine 210 evaluates optimizing rules 215, based at least in part, on analysis report 225 and analysis history 220 (block 322). If, for all rules tested, their Boolean conditions evaluate to "False" (decision 324, "No" branch), normal system operation resumes (block 310 and decision 312).

If the Boolean conditionals of one or more optimizing rules 215 evaluate to "True" (decision 324, "Yes" branch), optimizer 205 performs the actions of those optimizing rule(s) 215 that evaluated to "True" (block 328) and normal system operation resumes (block 310 and decision 312, "No" branch).

As will be recognized by one skilled in the relevant art, the paths, represented in the flowchart of FIG. 3, from block 314 through block 310 constitute a feedback loop, wherein occurrence of a problem triggers not only an analysis of the problem, but an analysis of the data supplied to diagnose the problem. Depending on the results of the analysis of the data supplied to diagnose the problem, modifications to the parameters that govern generation of the data may be made, modifications such that if it would have been useful to have additional data, additional data may be generated in the future and if extraneous data had been supplied, less data may be generated in the future.

Figure 4:
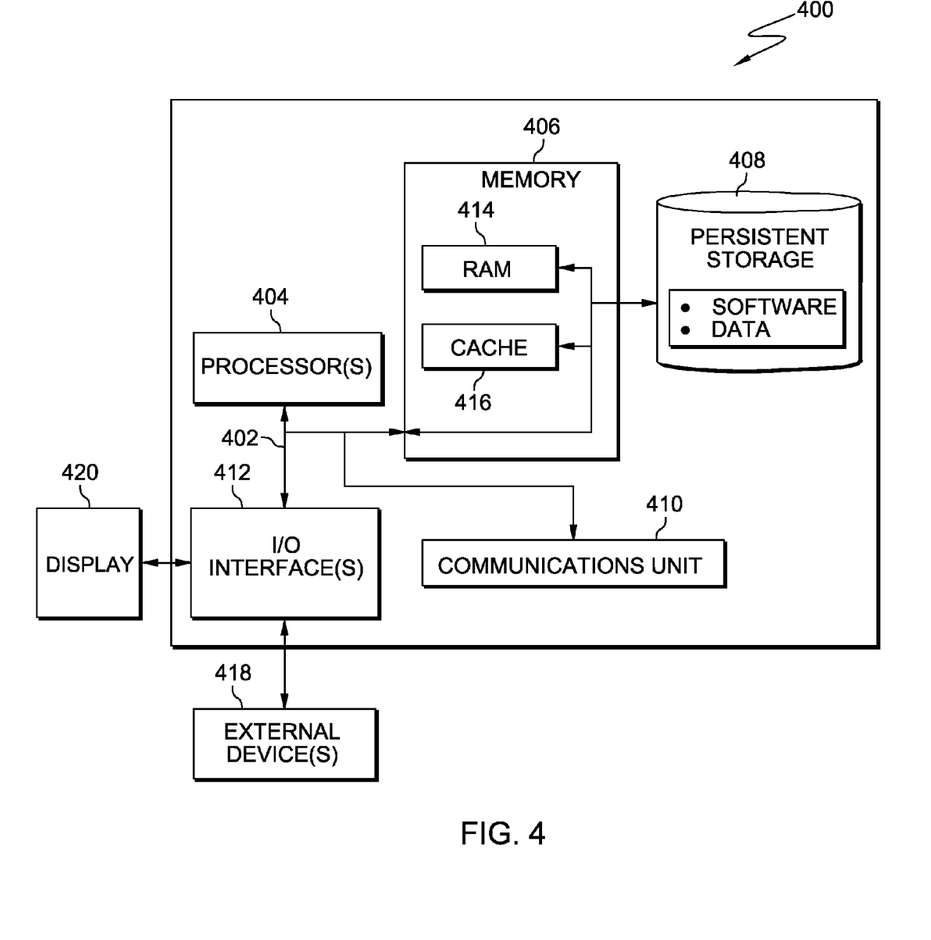
FIG. 4 depicts a block diagram of components of system 110, in accordance with an illustrative embodiment in accordance with the present invention.

FIG. 4 depicts a block diagram of components of system 110, in accordance with an illustrative embodiment in accordance with the present invention. It should be appreciated that FIG. 4 provides only an illustration of one implementation and does not imply any limitations with regard to the environments in which different embodiments may be implemented. Many modifications to the depicted environment may be made. For example, system 110 may comprise components spread through multiple systems and resources and may provide systems and resources beyond what is necessary to operate embodiments of the present invention.

System 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Software and data are stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by system 110. In these examples, communications unit 410 includes one or more wireless network interface cards. Communications unit 410 may provide communications through the use of either or both physical and wireless communications links. Computer programs and processes, software and data, may be downloaded to persistent storage 408 through communications unit 410.

I/O interface(s) 412 allows for input and output of data with other devices that may be connected to system 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
   one or more computer readable tangible storage media; and
   program instructions stored on at least one of the one or more storage media, the program instructions comprising computer code for causing a processor(s) set to perform at least the following operations:
      receiving, from an analysis repository, a plurality of analysis reports including a first analysis report, where the first analysis report includes log data collected with respect to a computer system error where the log data is generated in accordance with a data generation parameter,
      receiving a set of data collection optimizing goals, including a first data collection optimizing goal,
      determining, based at least in part on information in the plurality of analysis reports, that the first optimizing goal has not been met, and
      in response to determining that the first optimizing goal has not been met, modifying the data generation parameter in accordance with a first data collection optimizing rule;
   wherein the first data collection optimizing rule specifies that a software patch is to be installed.

2. The computer program product of claim 1 wherein the first data collection optimizing goal specifies a threshold minimum failure analysis success rate.

3. The computer program product of claim 1, wherein the first data collection optimizing rule specifies that on a first day of the week, data collection of a first data type will be conducted at a first level of detail.

4. The computer program product of claim 1, wherein the first data collection optimizing rule specifies that on a second day of the week, data collection of a first data type will be conducted at a second level of detail.

5. The computer program product of claim 1, wherein a second data collection optimizing rule specifies that the software patch is to be uninstalled.

6. The computer program product of claim 1, further comprising:
   determining that the first data collection optimizing rule specifies that user input should be logged; and
   in response to determining that the first data collection optimizing rule specifies that user input should be logged, enabling collection of user input.

7. A computer system comprising:
   one or more computer processors;
   one or more computer-readable storage media;
   program instructions stored on the computer-readable storage media for execution by at least one of the one or more processors, the program instructions comprising instructions to perform at least the following operations:
      receiving, from an analysis repository, a plurality of analysis reports including a first analysis report, where the first analysis report includes log data collected with respect to a computer system error where the log data is generated in accordance with a data generation parameter,
      receiving a set of data collection optimizing goals, including a first data collection optimizing goal,
      determining, based at least in part on information in the plurality of analysis reports, that the first optimizing goal has not been met, and
      in response to determining that the first optimizing goal has not been met, modifying the data generation parameter in accordance with a first data collection optimizing rule;
   wherein the first data collection optimizing rule specifies that a software patch is to be installed.

8. The computer system of claim 7, wherein the first data collection optimizing goal specifies a threshold minimum failure analysis success rate.

9. The computer system of claim 7, wherein the first data collection optimizing rule specifies that on a first day of the week, data collection of a first data type will be conducted at a first level of detail.

10. The computer system of claim 7, wherein the first data collection optimizing rule specifies that on a second day of the week, data collection of a first data type will be conducted at a second level of detail.

11. The computer system of claim 7, wherein a second data collection optimizing rule specifies that the software patch is to be uninstalled.

12. The computer system of claim 7, further comprising:
   determining that the first data collection optimizing rule specifies that user input should be logged; and
   in response to determining that the first data collection optimizing rule specifies that user input should be logged, enabling collection of user input.

* * * * *